United States Patent
Yuzurihara et al.

(10) Patent No.: US 6,177,167 B1
(45) Date of Patent: Jan. 23, 2001

(54) OPTICAL INFORMATION RECORDING MEDIUM

(75) Inventors: Hajime Yuzurihara; Hiroko Tashiro; Hiroshi Deguchi, all of Kanagawa (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/199,846

(22) Filed: Nov. 25, 1998

(30) Foreign Application Priority Data

Dec. 2, 1997 (JP) .................................................. 9-347175

(51) Int. Cl.$^7$ .................................................. B32B 3/02
(52) U.S. Cl. ...................... 428/64.1; 428/64.4; 428/64.5; 428/64.6; 428/457; 428/913; 430/270.13; 430/495.1; 430/945; 369/283; 369/288
(58) Field of Search ................... 428/64.1, 64.2, 428/64.4, 64.5, 64.6, 457, 913; 430/270.13, 495.1, 945; 369/283, 288

(56) References Cited

U.S. PATENT DOCUMENTS

| | | |
|---|---|---|
| 5,736,657 | 4/1998 | Ide et al. . |
| 5,948,496 * | 9/1999 | Kinoshita .............................. 428/64.1 |
| 6,018,510 * | 1/2000 | Abe et al. .......................... 369/275.1 |

* cited by examiner

*Primary Examiner*—Elizabeth Evans
(74) *Attorney, Agent, or Firm*—Cooper & Dunham LLP

(57) ABSTRACT

An optical information recording medium includes a first dielectric protective layer, a recording layer provided on the first dielectric protective layer, including a material represented by a chemical formula of $Ag\alpha In\beta Sb\gamma Te\delta$, wherein $\alpha$, $\beta$, $\gamma$ and $\delta$ respectively represent an atomic percent of Ag, an atomic percent of In, an atomic percent of Sb, and an atomic percent of Te, and satisfy the conditions of:

$1 \leq \alpha < 10$,
$1 < \beta \leq 20$,
$35 \leq \gamma \leq 70$,
$20 \leq \delta \leq 35$,
$\alpha + \beta + \gamma + \delta = 100$,
$4\beta - \delta \leq 0$,
$\gamma - 2\delta \geq 0$, and
$\gamma - 8\alpha \geq 0$, a second dielectric protective layer provided on the recording layer, and a light reflection and heat dissipation layer provided on the second dielectric protective layer.

4 Claims, 1 Drawing Sheet

7 ORGANIC ENVIRONMENT PROTECTIVE LAYER
6 LIGHT REFLECTION AND HEAT DISSIPATION LAYER
5 HEAT DISSIPATION LAYER
4 SECOND DIELECTRIC PROTECTIVE LAYER
3 RECORDING LAYER
2 FIRST DIELECTRIC PROTECTIVE LAYER
1 SUBSTRATE

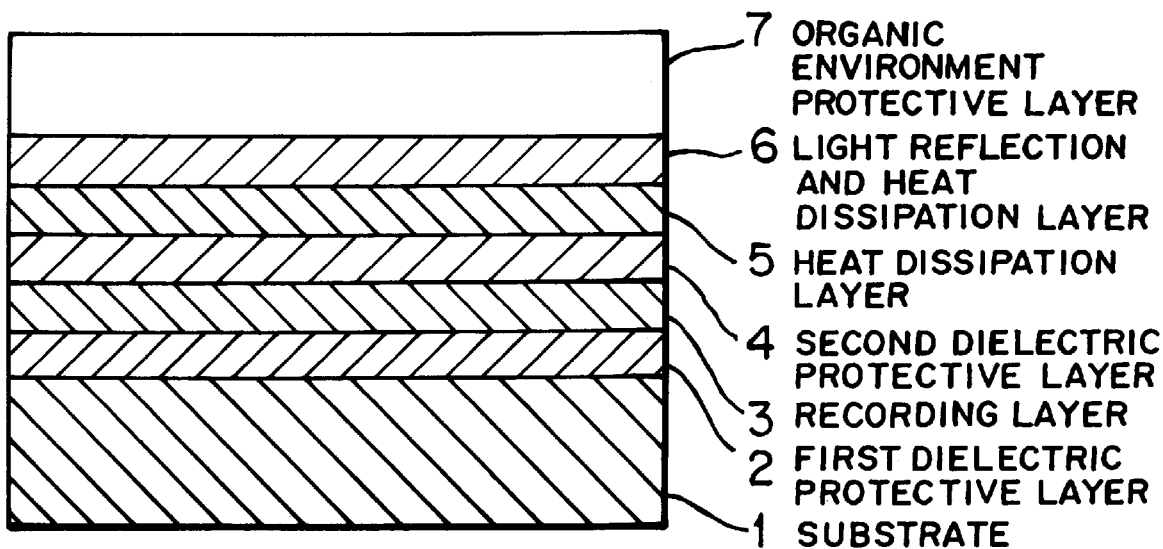

OPTICAL INFORMATION RECORDING MEDIUM

BACKGROUND OF THE INVENTION

1. Field of the Invention

The present invention relates to a rewritable phase-change optical information recording medium having a large recording capacity and capable of rewriting information recorded therein.

2. Discussion of Background

As optical information recording media which are capable of recording information therein, and from which recorded information can be reproduced or erased by the application of semi-conductor laser beams thereto, there are conventionally known (1) a magneto-optical recording medium in which information can be recorded, and recorded information can be erased by reversing a magnetization direction of a recording layer thereof, utilizing heat, and (2) a phase-change optical information recording medium in which information can be recorded, and recorded information can be erased, utilizing phase changes between a crystalline phase and an amorphous phase of a recording layer thereof.

The latter phase-change optical information recording medium is capable of performing single beam overwriting, and is advantageous over other optical recording media in the compatibility with CD-ROM and CD-R media, so that the standardization of the phase-change optical information recording media as rewritable media, namely as CD-RW, has now been established, and the phase-change optical information media have now been commercialized.

In the meantime, large capacity storage by the phase-change optical information recording media has been studied, and DVD-ROM media have been placed on the market. In accordance with the apparatus of the DVD-ROM on the market, media called DVD-RAM are now being developed as rewritable DVD media. A DVD-RAM with a capacity of 2.6 GB will be shortly commercialized, but there is now a demand for a DVD-RAM with a capacity larger than that of ROM media.

As the materials for use in the recording layer of the phase-change optical information recording medium, chalcogen-based alloys, such as Ge—Sb—Te, In—Sb—Te, Ge—Se—Te, Ge—Te—Bi, Sb—Se—Te, and In—Te—Au have been investigated. Of these chalcogen-based alloys, Ge—Sb—Te has now reached a level for use in practice. However, even with this Ge—Sb—Te, further improvements are desired on the recording sensitivity, erasing sensitivity, and erasing ratio at overwriting.

Japanese Laid-Open Patent Applications 4-78031 and 9-263055 disclose phase-change information recording media using as recording materials in the recording layers thereof Ag—In—Sb—Te based alloys by use of which the erasing ratio of the phase-change information recording media at the overwriting is improved.

However, the repeated use overwriting characteristics of a phase-change optical information recording medium using the above-mentioned Ag—In—Sb—Te based recording material cannot be improved by using the Ag—In—Sb—Te based recording materials only, but by using upper and lower protective layers, and a heat dissipation layer which are overlaid.

As the materials for such protective layers, $ZnS.SiO_2$ as disclosed in Japanese Patent Publication 7-114031, metallic oxides, metallic sulfides and metallic nitrides, and mixtures thereof are conventionally proposed. However, the improvement of the repeated use overwriting characteristics of the phase-change optical information recording medium is still insufficient for use in practice.

As mentioned above, the phase-change optical information recording media have now been commercialized as CD-RW. The CD-RW is used as an external memory device for use with personal computers. Recently DVD-ROM players are placed on the market, so that there is a great demand for large capacity, rewritable DVD media.

The DVD-RAM which has now been commercialized as rewritable DVD medium has a capacity of 2.6 GB, and recording and reproduction is conducted at a linear speed of about 6 m/sec, while in DVD-ROM, the linear speed for recording and reproduction is about 3.5 m/sec, and the capacity of DVD-ROM is 4.7 GB. It is required that rewritable DVD media have a capacity greater than that of ROM, be capable of peforming recording and reproduction at a speed of two times greater than that of ROM, and be compatible with ROM. In order to meet such requirements, it is strictly required that the DVD media have a high line density, a low jitter, and a large overwriting repetition number. In particular, the improvement of the overwriting repetition number is one of most significant targets to be cleared in the phase-change optical information recording media in order to enhance the performance reliability of the media. The Ag—In—Sb—Te based phase-change recording materials are suitable for high density recording, so that how to improve the overwriting repetition characteristics thereof is still a significant target to be cleared.

SUMMARY OF THE INVENTION

It is therefore a first object of the present invention to provide an Ag—In—Sb—Te based phase-change optical information recording medium with high overwriting repetition number, high recording density, excellent recording and reproduction characteristics capable of attaining high speed recording and reproduction.

A second object of the present invention to provide a heat dissipation layer and a protective layer for use in the above-mentioned optical information recording medium of the present invention in order to attain the above object of the present invention, in particular, high speed recording and reproduction.

The first and second objects of the present invention can be achieved by an optical information recording medium comprising:

a first dielectric protective layer, a recording layer provided on said first dielectric protective layer, comprising a material represented by a chemical formula of $Ag\alpha In\beta Sb\gamma Te\delta$, wherein $\alpha$, $\beta$, $\gamma$ and $\delta$ respectively represent an atomic percent of Ag, an atomic percent of In, an atomic percent of Sb, and an atomic percent of Te, and satisfy the conditions of:

$1 \leq \alpha < 10$, $1 < \beta \leq 20$, $35 \leq \gamma \leq 70$, $20 \leq \delta \leq 35$, $\alpha + \beta + \gamma + \delta = 100$, $4\beta - \delta \leq 0$, $\gamma - 2\delta \geq 0$, and $\gamma - 8\alpha \leq 0$, a second dielectric protective layer provided on said recording layer, and a light reflective and heat dissipation layer provided on said second dielectric protective layer.

The above-mentioned optical information recording medium may further comprise a heat dissipation layer which is interposed between the second dielectric protective layer and the light reflection and heat dissipation layer, the heat dissipation layer comprising a material which comprises Mg, In and O, with the atomic ratios of Mg and In satisfying a formula of 0.60<In/(In+Mg)<1.0.

Furthermore, in the above-mentioned optical information recording medium, it is preferable that the heat dissipation layer and the second dielectric protective layer respectively have a thickness of D1 and a thickness of D2, with a ratio of D1:D2 being in a range of (10:90) to (50:50).

It is also preferable that in the above-mentioned optical information recording medium, the heat dissipation layer have a refractive index of 1.9 to 2.1.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The single FIGURE is a schematic cross-sectional view of an example of an optical information recording medium of the present invention.

DESCRIPTION OF THE PREFERRED EMBODIMENTS

With reference to the accompanying Single FIGURE, an example of an optical information recording medium of the present invention will now be explained.

In the FIGURE, reference numeral 1 represents a substrate; reference numeral 2, a first dielectric protective layer; reference numeral 3, a recording layer; reference numeral 4, a second dielectric protective layer; reference numeral 5, a heat dissipation layer; reference numeral 6, a light reflection and heat dissipation layer; and reference numeral 7, an organic environment protective layer. Each of the above layers, for example, the heat dissipation layer 5 may be composed of two overlaid layers.

Specific examples of the materials for use in the first and second dielectric protective layers 2 and 4 are metallic oxides such as $SiO_x$, ZnO, $SnO_2$, $Al_2O_3$, $TiO_2$, $In_2O_3$, MgO, $ZrO_2$ and $Ta_2O_5$; nitrides such as $Si_3N_4$, AlN, TiN, BN and ZrN; sulfides such as ZnS and $TaS_4$; carbides such as SiC, TaC, $B_4C$, WC, TiC and ZrC. These materials can be used either in the form of a simple body or in the form of a mixture. Examples of the mixtures are a mixture of ZnS and $SiO_x$ and a mixture of $Ta_zO_S$ and $SiO_x$. Each of the above-mentioned materials is suitable for use in the first and second dielectric protective layers 2 and 4 with respect to the physical properties thereof, such as thermal conductivity, specific heat, coefficient of thermal expansion, refractive index, and adhesion to materials for the substrate and/or recording layer, and has advantages over other materials, particularly with respect to high melting point, high thermal conductivity, and low coefficient of thermal expansion and excellent adhesion to the materials for the substrate and/or the recording layer. In particular, the characteristics of the second dielectric protective layer have significant effects on the overwriting repetition number and the sensitivity of the optical information recording material.

With respect to the above-mentioned protective layers, a layer thickness is an important factor which has significant effects on the performance of the optical information recording material.

It is preferable that the first dielectric protective layer 2 have a thickness in the range of 50 to 250 nm, more preferably in the range of 75 to 200 nm. When the thickness of the first dielectric protective layer 2 is less than 50 nm, a protection effect from the environment conditions, a heat resistant effect, and a heat accumulation effect tend to be lowered, while when the thickness of the first dielectric protective layer 2 is more than 250 nm, the first protective layer 2 tends to be peeled away or cracked when the temperature thereof is increased in the course of the formation of the first protective layer 2 by sputtering or the like, and when such peeling or cracking takes place in the first dielectric protective layer 2, the recording sensitivity of the optical information recording material tends to be lowered.

It is preferable that the second dielectric protective layer 4 have a thickness in the range of 10 to 100 nm, more preferably in the range of 15 to 50 nm. When the thickness of the second dielectric protective layer 4 is less than 10 nm, the heat resistance effect thereof tends to be lowered, when the thickness exceeds 100 nm, the overwriting repetition characteristics of the optical information recording medium tend to be impaired because of the lowering of the recording sensitivity of the optical information recording medium, the peeling away and the deformation of the second dielectric protective layer 4 by the elevation of the ambient temperature, and the lowering of the heat dissipation characteristics thereof.

Specific examples of the materials for the light reflection and heat dissipation layer 6 include metals such as Al, Au, Cu, Ag, Cr, Sn, Zn, In, Pd, Zr, Fe, Co, Ni, Si, Ge, Sb, Ta, W, Ti and Pb, alloys thereof, and mixtures thereof. When necessary, the light reflection and heat dissipation layer 6 may be composed of a plurality of overlaid layers, for instance, each comprising a different metal or alloy, or a mixture of a different metal or a different alloy, or a mixture a different metal and a different alloy.

The light reflection and heat dissipation layer 6 is an important layer for effectively dissipating heat.

It is preferable that the light reflection and heat dissipation layer 6 have a thickness in the range of 30 to 250 nm, more preferably in the range of 50 to 150 nm.

When the light reflection and heat dissipation layer 6 is too thick, the heat dissipation effect becomes so high that the sensitivity of the optical information recording medium tends to be lowered, while when the light reflection and heat dissipation layer 6 is too thin, the sensitivity of the optical information recording medium become good, but the overwriting repetition characteristics of the optical information recording medium tend to be impaired. It is required that the light reflection and heat dissipation layer 6 have high thermal conductivity, high melting point and good adhesiveness to the materials of the layers adjacent thereto.

It is preferable that the heat dissipation layer 5 comprise an Mg—In—O based oxide, with a ratio of In/(In+Mg) being in the range of 0.60 to 1.0. It is more preferable that the Mg—In—O based oxide have a resistivity of $10^{-4}$ Ω·cm or less. The Mg—In—O based oxide is preferable for use in the heat dissipation layer 5 because of its high melting point. The above-mentioned range of 0.60 to 1.0 in terms of In/(In+Mg) corresponds to a mixture of 1 mole of $In_2O_3$ and not more than 0.40 moles of MgO.

A thin film of $In_2O_3$ has high light transmittance, but is not considered to have a sufficiently low resistivity. MgO is not suitable for mass producing a thin film thereof because of too low the film formation speed thereof to perform the mass production thereof. It is preferable that In/(In+Mg) being in the range of 0.8 to 0.9.

The Mg-In-O based oxide has high electroconductivity when the ratio of In/(In+Mg) is in the range of 0.60 to 1.0 and has a refractive index of about 2. Therefore, the Mg—In—O based oxide contains MgO having a high melting point and has a light transmittance of 80%, so that when the Mg—In—O based oxide is used in the heat dissipation layer 5, the heat dissipation layer 5 has a higher thermal conductivity than that of the second dielectric protective layer 2.

It is preferable that the heat dissipation layer 5 have a refractive index in the range of 1.9 to 2.1 so as to have substantially the same refractive index as that of the second dielectric protective layer 4.

It is preferable that the ratio of the thickness of the second dielectric protective layer 4 composed of $ZnS \cdot SiO_2$ to the thickness of the heat dissipation layer 5 composed of the $MgO$—$In_2O_3$ based material be optimized. This ratio becomes more important as the line density and the linear speed are increased. In this case, a large power is required since the recording frequency is increased and accordingly the laser pulse width is narrowed at the time of recording. However, when the power is increased, the temperature is accordingly elevated, so that heat accumulates, the overwriting repetition number decreases, the edges of recording marks blur, the recording marks are shifted in position, with improper jittering.

In order to have the layer thickness ratio optimizing effect exhibit when the heat dissipation layer 5 composed of the Mg—In—O based oxide and the second dielectric protective layer 4 composed of $ZnS \cdot SiO_2$ are overlaid, it is preferable that the ratio of the thickness of the second dielectric protective layer 4: the thickness of the heat dissipation layer 5 be in the range of (50:50) to (90:10), more preferably in the range of (60:40) to (80:20). In the case where the heat dissipation layer 5 is thicker than the second dielectric protective layer 4, heat accumulation is difficult to be performed, so that the sensitivity and jittering performance of the optical information recording medium are impaired. When a excessively thin heat dissipation layer does not exhibit sufficient heat dissipation effect.

Recording is performed in the optical information recording medium composed of the above-mentioned materials, with the application of a semiconductor laser beam with a wavelength of 635 nm, using an Na 0.6 pickup, and reproduction is performed in the above optical information recording medium with the application of a semiconductor laser with a wavelength of 650 nm, using an NA 0.6 pickup. The recording method is conducted, using a pulse width modulation system with a modulation code of EFM+[8/16, RLL(2,10)].

Other features of this invention will become apparent in the course of the following description of exemplary embodiments, which are given for illustration of the invention and are not intended to be limiting thereof.

EXAMPLE 1

A substrate made of polycarbonate with a thickness of 0.6 mm, a track pitch of 0.74 μm, and a groove with a width of 0.45 μm and a depth of 50 nm was subjected to a dehydration processing at 70 to 80° C.

A first dielectric protective layer with a thickness of 170 nm was formed on the above substrate by sputtering, using a $ZnS \cdot SiO_2$ target.

A recording layer with a thickness of 18 nm was formed on the above first dielectric protective layer by sputtering, using an AgInSbTe target with a composition as shown in Example 1 in TABLE 1, at an argon gas pressure of $3 \times 10^{-3}$ torr, with a RF power of 300 W.

A second dielectric protective layer with a thickness of 170 nm was formed on the above recording layer by sputtering, using a $ZnS \cdot SiO_2$ in the same manner as with the above-mentioned first dielectric protective layer.

A light reflection and heat dissipation layer made of an AlTi alloy layer with a thickness of 120 nm was formed on the above second dielectric protective layer by sputtering.

Finally, a protective layer made of an ultraviolet curing resin film was formed by coating on the above light reflection and heat dissipation layer, whereby an optical information recording medium No. 1 of the present invention was fabricated.

After the above fabrication of the optical information recording medium No. 1, the recording layer thereof was in an amorphous state, so that the optical information recording medium No. 1 was initialized by crystallizing the recording layer.

Recording was performed the application of a semiconductor laser beam with a wavelength (λ) of 635 nm to the optical information recording medium No. 1, using an NA 0.6 pickup, using the pulse width modulation system with a modulation code of EFM+[8/16, RLL(2,10)]. The linear speed at the time of recording and reproduction was varied in the range of 3.5 m/sec to 7 m/sec in accordance with the composition of the recording layer. The ratio of the recording power/the erasing power was set in the range of about 2 to 2.2, and the recording was conducted with a bottom power set at the same as or below the reproduction power. The recording power was applied up to 15 mW (maximum). Recording was conducted in the groove of the optical information recording medium No. 1 with the recording frequency for the recording set in the range of 23.3 MHz to 46.6 MHz. Furthermore, a data to clk jitter was measured for the specific composition of the recording layer by performing the recording and the reproduction.

Furthermore, the recording was performed with an optimum recording power at which the jitter σ/Tw (Tw; window width) was minimized. This recording was repeated to perform the overwriting. The overwriting repetition number shown in TABLE 1 is the number at which the jitter was 10% or less.

EXAMPLES 2 TO 9

The same procedure as in Example 1 was repeated except that the composition of the recording layer was changed as shown in TABLE 1, whereby optical information recording media No. 2 to No. 9 of the present invention were fabricated and the overwriting repetition number of each of the optical information recording media No. 2 to No. 9 was measured in the same manner as in Example 1. The results are shown in TABLE 1.

COMPARATIVE EXAMPLES 1 TO 16

The same procedure as in Example 1 was repeated except that the composition of the recording layer was changed as shown in TABLE 2, whereby comparative optical information recording media No. 1 to No. 16 were fabricated and the overwriting repetition number of each of the comparative optical information recording media No. 1 to No. 16 was measured in the same manner as in Example 1. The results are shown in TABLE 2.

The results shown in TABLE 1 and TABLE 2 indicate that the optical information recording media No. 1 to No. 9 of the present invention shown in TABLE 1 are capable of attaining significantly higher overwriting repetition numbers and accordingly better performance reliability than those attained by the comparative optical information recording media No. 1 to No. 16 shown in TABLE. 2.

EXAMPLE 10

A substrate made of polycarbonate with a thickness of 0.6 mm, a track pitch of 1.48 $\mu$m, and a groove with a width of 0.74 $\mu$m and a depth of 65 nm was subjected to a dehydration processing at high temperature.

A first dielectric protective layer with a thickness of 170 nm was formed on the above substrate by sputtering, using a ZnS.SiO$_2$ target.

A recording layer with a thickness of 18 nm was formed on the above first dielectric protective layer by sputtering, using an AgInSbTe target with the same composition as in Example 1 as shown in TABLE 1, at a mixed gas pressure of $3 \times 10^{-3}$ torr, with a flow of 0.5 sccm of a mixed gas of argon and nitrogen gasses, with a RF power of 300 W.

A second dielectric protective layer with a thickness of 170 nm was formed on the above recording layer by sputtering, using a ZnS.SiO$_2$ in the same manner as with the above-mentioned first dielectric protective layer.

A heat dissipation layer comprising a Mg—In—O oxide based material, having a refractive index of about 2.1, with a thickness of 250 nm, with the ratio of the thickness of the second dielectric protective layer to the thickness of the heat dissipation layer being 50:50, and with an In/(In+Mg) ratio of 0.96, was formed on the second dielectric protective layer.

A light reflection and heat dissipation layer made of an AlTi alloy layer with a thickness of 120 nm was formed on the above heat dissipation layer by sputtering.

Finally, a protective layer made of an ultraviolet curing resin film was formed on the above light reflection and heat dissipation layer, whereby an optical information recording medium No. 10 of the present invention was fabricated.

Recording was performed with the application of a semiconductor layer beams with a wavelength ($\lambda$) of 635 nm, using an NA 0.6 pickup, using the pulse width modulation system with a modulation code of EFM+[8/16, RLL (2,10)].

The ratio of the recording power/the erasing power was set in the range of about 2 to 2.2, and the reproduction power was set at 1 mW. The recording was conducted in the groove of the optical information recording medium No. 10 with a bottom power set at the same as or below the reproduction power. With the linear speed set at 3.5 m/sec and the recording frequency set at 23.3 MHz, the recording was conducted. Overwriting was repeated with a recording power at which the jitter was minimized. As the jitter, a data to clk jitter was measured.

EXAMPLES 11 TO 14

The same procedure as in Example 10 was repeated except that the ratio of the thickness of the second dielectric protective layer to the thickness of the heat dissipation layer was changed as shown in TABLE 3, whereby optical information recording media No. 11 to No. 14 of the present invention were fabricated, and the overwriting repetition number of each of the optical information recording media No. 11 to No. 14 was measured. The results are shown in TABLE 3.

COMPARATIVE EXAMPLE 17

The same procedure as in Example 10 was repeated except the composition of the recording layer was changed to the same composition of the recording layer as in Comparative Example 5, and that and the In/(In+Mg) ratio was changed to 0.98, whereby a comparative optical information recording medium No. 17 was fabricated, and the overwriting repetition number of the comparative optical information recording medium No. 17 was measured. The results are shown in TABLE 3.

COMPARATIVE EXAMPLE 18

The same procedure as in Comparative Example 17 was repeated except that the ratio of the thickness of the second dielectric protective layer to the thickness of the heat dissipation layer was changed as shown in TABLE 3, whereby a comparative optical information recording medium No. 18 was fabricated, and the overwriting repetition number of the optical information recording medium No. 18 was measured. The results are shown in TABLE 3.

The results shown in TABLE 3 indicate that the overwriting repetition number is optimized when the composition of the recording layer, the In/(In+Mg) ratio, and the ratio of the thickness of the second dielectric protective layer to the thickness of the heat dissipation layer are in the respective ranges as defined in the present invention. The overwriting repetition number shown in TABLE 3 is also the number at which the jitter was 10% or less.

TABLE 1

| No. | Ag $\alpha$ | In $\beta$ | Sb $\gamma$ | Te $\delta$ | $4\beta - \beta \leq 0$ | $\gamma - 2\delta \leq 0$ | $\gamma - 8\alpha \leq 0$ | Overwriting Repetition Number |
|---|---|---|---|---|---|---|---|---|
| Ex. 1 | 3.8 | 7.0 | 61.0 | 28.2 | −0.2 | 4.6 | 30.6 | 10000 |
| Ex. 2 | 4.0 | 3.0 | 63.6 | 29.4 | −17.4 | 4.8 | 31.6 | 50000 |
| Ex. 3 | 4.6 | 6.0 | 60.0 | 29.4 | −5.4 | 1.2 | 23.2 | 30000 |
| Ex. 4 | 6.0 | 4.0 | 63.0 | 27.0 | −11.0 | 9.0 | 15.0 | 40000 |
| Ex. 5 | 5.6 | 4.0 | 64.0 | 26.4 | −10.4 | 11.2 | 19.2 | 40000 |
| Ex. 6 | 1.0 | 3.0 | 62.4 | 30.6 | −18.6 | 1.2 | 30.4 | 45000 |
| Ex. 7 | 4.0 | 3.0 | 65.4 | 27.6 | −15.6 | 10.2 | 33.4 | 55000 |
| Ex. 8 | 5.0 | 4.4 | 62.0 | 28.6 | −11.0 | 4.8 | 22.0 | 60000 |
| Ex. 9 | 6.2 | 5.2 | 60.6 | 28.0 | −7.2 | 1.6 | 11.0 | 35000 |

TABLE 2

| No. | Ag α | In β | Sb γ | Te δ | 4β − δ ≦ 0 | γ − 2δ ≦ 0 | γ − 8α ≦ 0 | Overwriting Repetition Number |
|---|---|---|---|---|---|---|---|---|
| Comp. Ex. 1 | 3.8 | 11.8 | 62.4 | 22.0 | 25.2 | 18.4 | 32.0 | 3000 |
| Comp. Ex. 2 | 3.2 | 9.7 | 63.3 | 23.8 | 15.0 | 15.7 | 37.7 | 5000 |
| Comp. Ex. 3 | 2.8 | 10.0 | 61.8 | 25.4 | 14.6 | 11.0 | 39.4 | 3000 |
| Comp. Ex. 4 | 6.0 | 8.0 | 59.0 | 27.0 | 5.0 | 5.0 | 11.0 | 3000 |
| Comp. Ex. 5 | 5.6 | 7.5 | 60.5 | 26.4 | 3.6 | 7.7 | 15.7 | 7000 |
| Comp. Ex. 6 | 9.0 | 6.0 | 59.0 | 26.0 | −2.0 | 7.0 | −13.0 | 9000 |
| Comp. Ex. 7 | 3.6 | 11.0 | 58.4 | 27.0 | 17.0 | 4.4 | 29.6 | 1000 |
| Comp. Ex. 8 | 1.5 | 10.0 | 60.5 | 28.0 | 12.0 | 4.5 | 48.5 | 1000 |
| Comp. Ex. 9 | 3.8 | 9.5 | 59.0 | 27.6 | 10.4 | 3.8 | 28.6 | 900 |
| Comp. Ex. 10 | 3.6 | 12.0 | 59.0 | 25.4 | 22.6 | 8.2 | 30.2 | 500 |
| Comp. Ex. 11 | 5.6 | 10.8 | 57.2 | 26.4 | 16.8 | 4.4 | 12.4 | 300 |
| Comp. Ex. 12 | 4.1 | 12.3 | 53.4 | 30.2 | 19.0 | −7.0 | 20.6 | 100 |
| Comp. Ex. 13 | 3.4 | 10.2 | 55.0 | 31.4 | 9.4 | −7.8 | 27.8 | 100 |
| Comp. Ex. 14 | 8.0 | 8.0 | 57.0 | 27.0 | 5.0 | 3.0 | −7.0 | 700 |
| Comp. Ex. 15 | 6.0 | 9.0 | 59.0 | 26.0 | 10.0 | 7.0 | 11.0 | 1000 |
| Comp. Ex. 16 | 3.6 | 11.5 | 58.4 | 27.5 | 18.5 | 3.4 | 29.6 | 900 |

TABLE 3

| | Second Dielectric Protective Layer | Heat Dissipation Layer In/(In + Mg) | Layer Thickness Ratio of Second Dielectric Protective Layer to Heat Dissipation Layer | Overwriting Repetition Number | Composition of Recording Layer |
|---|---|---|---|---|---|
| Ex. 10 | ZnS · SiO$_2$ | 0.96 | 50:50 | 10000 | Same as in Ex. 1 |
| Ex. 11 | ZnS SiO$_2$ | 0.96 | 60:40 | 15000 | Same as in Ex. 1 |
| Ex. 12 | ZnS · SiO$_2$ | 0.96 | 70:30 | 20000 | Same as in Ex. 1 |
| Ex. 13 | ZnS · SiO$_2$ | 0.96 | 80:20 | 30000 | Same as in Ex. 1 |
| Ex. 14 | ZnS · SiO$_2$ | 0.96 | 90:10 | 20000 | Same as in Ex. 1 |
| Comp. Ex. 17 | ZnS · SiO$_2$ | 0.98 | 50:50 | 7500 | Same as in Comp. Ex. 5 |
| Comp. Ex. 18 | ZnS · SiO$_2$ | 0.98 | 60:40 | 9000 | Same as in Comp. Ex. 5 |

Japanese Patent Application No. 09-347175 filed Dec. 2, 1997 is hereby incorporated by reference.

What is claimed is:

1. An optical information recording medium comprising:
   a first dielectric protective layer,
   a recording layer provided on said first dielectric protective layer, comprising a material represented by a chemical formula of Ag$\alpha$In$\beta$Sb$\gamma$Te$\delta$, wherein $\alpha$, $\beta$, $\gamma$ and $\delta$ respectively represent an atomic percent of Ag, an atomic percent of In, an atomic percent of Sb, and an atomic percent of Te, and satisfy the conditions of:

$1 \leq \alpha < 10$,
$1 < \beta \leq 20$,
$35 \leq \gamma \leq 70$,
$20 \leq \delta \leq 35$,
$\alpha + \beta + \gamma + \delta = 100$,
$4\beta - \delta \leq 0$,
$\gamma - 2\delta \geq 0$, and
$\gamma - 8\alpha \geq 0$, a second dielectric protective layer provided on said recording layer, a light reflection and heat dissipation layer provided on said second dielectric protective layer, and a heat dissipation layer which is interposed between said second dielectric protective layer and said light reflection and heat dissipation layer, said heat dissipation layer comprising a Mg—In—O based oxide, with the atomic ratios of Mg and In satisfying a formula of:

$$0.60 < In/(In+Mg) < 1.0.$$

2. The optical information recording medium as claimed in claim 1, wherein said heat dissipation layer and said second dielectric protective layer respectively have a thickness of D1 and a thickness of D2, with a ratio of D1:D2 being in a range of 10:90 to 50:50.

3. The optical information recording medium as claimed in claim 2, wherein said heat dissipation layer has a refractive index of 1.9 to 2.1.

4. The optical information recording medium as claimed in claim 1, wherein said heat dissipation layer has a refractive index of 1.9 to 2.1.

* * * * *